(12) United States Patent
Shang et al.

(10) Patent No.: US 11,520,512 B2
(45) Date of Patent: Dec. 6, 2022

(54) METHOD FOR STORAGE MANAGEMENT, ELECTRONIC DEVICE AND COMPUTER PROGRAM PRODUCT

(71) Applicant: EMC IP Holding Company LLC, Hopkinton, MA (US)

(72) Inventors: Rongrong Shang, Beijing (CN); Shaoqin Gong, Beijing (CN); Yousheng Liu, Beijing (CN); Xinlei Xu, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 16/890,368

(22) Filed: Jun. 2, 2020

(65) Prior Publication Data
US 2021/0132845 A1    May 6, 2021

(30) Foreign Application Priority Data
Oct. 31, 2019  (CN) .......................... 201911054378.9

(51) Int. Cl.
*G06F 3/06* (2006.01)
(52) U.S. Cl.
CPC .......... *G06F 3/0644* (2013.01); *G06F 3/0604* (2013.01); *G06F 3/0631* (2013.01); *G06F 3/0689* (2013.01)
(58) Field of Classification Search
CPC ........ G06F 3/06; G06F 3/0644; G06F 3/0604; G06F 3/0689; G06F 3/0631

USPC ......................................................... 711/114
See application file for complete search history.

(56) References Cited

U.S. PATENT DOCUMENTS

| | | | |
|---|---|---|---|
| 6,895,467 B2* | 5/2005 | Lubbers | G06F 3/0601 |
| | | | 711/170 |
| 9,933,945 B1 | 4/2018 | Mao et al. | |
| 11,023,147 B2 | 6/2021 | Shang et al. | |
| 11,150,991 B2 | 10/2021 | Ma et al. | |
| 2020/0341637 A1 | 10/2020 | Shang et al. | |

(Continued)

OTHER PUBLICATIONS

Wright, Stephen. Dell EMC PowerStore: Best Practices Guide, Dell Technologies (Jun. 2021) (Year: 2021).*

(Continued)

*Primary Examiner* — Michael Krofcheck
(74) *Attorney, Agent, or Firm* — BainwoodHuang

(57) ABSTRACT

Techniques involve determining a first slice distribution used to build first storage units in a first pool; in response to a determination that the first pool is expanded to a second pool, determining, at least based on a sum of the slices having been used to build the first storage units, a second slice distribution of updated slices used to build the first storage units in the second pool; determining, based on the first distribution and the second distribution, a first available number of slices and a second available number of slices available for building second storage units in the second pool, the second storage units being different from the first storage units; and determining, at least based on the first available number and the second available number, the number of the second storage units allowed to be built. Accordingly, available capacity allowed for building can be accurately estimated.

8 Claims, 5 Drawing Sheets

(56) References Cited

U.S. PATENT DOCUMENTS

2021/0132843 A1   5/2021  Shang et al.
2021/0216225 A1   7/2021  Shang et al.

OTHER PUBLICATIONS

Patterson, David et al. A Case for Redundant Arrays of Inexpensive Disks (RAID), Association for Computing Machinery (1988 ACM) (Year: 1988).*

* cited by examiner

METHOD FOR STORAGE MANAGEMENT, ELECTRONIC DEVICE AND COMPUTER PROGRAM PRODUCT

CROSS-REFERENCE TO RELATED APPLICATION

This application claims priority to Chinese Patent Application No. CN201911054378.9, on file at the China National Intellectual Property Administration (CNIPA), having a filing date of Oct. 31, 2019, and having "METHOD FOR STORAGE MANAGEMENT, ELECTRONIC DEVICE AND COMPUTER PROGRAM PRODUCT" as a title, the contents and teachings of which are herein incorporated by reference in their entirety.

FIELD

Embodiments of the present disclosure generally relate to data storage, and more specifically, to method, device and computer program product for the storage management.

BACKGROUND

Before the mapper allocates storage units from Redundant Arrays of Independent Disks (RAID), the mapper will query how many storage units are currently available for the RAID. The RAID has to loop over all RAID resiliency sets (RRS) and sums up all available RRS capacity. The agreement between the mapper and RAID is that if the RAID promises that the mapper can allocate a predetermined number of storage units, the mapper should be able to allocate the predetermined number of storage units immediately without failure.

This means that RAID should perform the estimation based on the current utilization of each disk. When the slice pool is expanded by adding some new disks, the RAID may regroup disks into the new RRS and then reassign the existing disks to the new RRS group. Based on the storage unit reassignment, the RAID will rebalance to re-layout the storage units. At this time, when the mapper asks RAID for available capacity, the situation after rebalancing should be taken into account for the estimation of the available capacity.

SUMMARY

Embodiments of the present disclosure relate to method, device and computer program product for the storage management.

In a first aspect of the embodiments of the present disclosure, there is provided a method for storage management. The method includes determining a first distribution of disk slices having been used to build a first set of storage units in a first slice pool; in response to a determination that the first slice pool is expanded to a second slice pool, determining, at least based on a sum of the disk slices having been used to build the first set of storage units, a second distribution of updated disk slices used to build the first set of storage units in the second slice pool; determining, based on the first distribution and the second distribution, a first available number of disk slices and a second available number of disk slices available for building a second set of storage units in the second slice pool, the second set of storage units being different from the first set of storage units; and determining, at least based on the first available number and the second available number, the number of the second set of storage units allowed to be built.

In a second aspect of the embodiments of the present disclosure, there is provided an electronic device. The device includes at least one processor and at least one memory including computer program instructions and a memory coupled to the at least one processor, the memory having instructions stored therein, the instructions, when executed by the at least one processing unit, causing the device to execute acts. The acts including determining a first distribution of disk slices having been used to build a first set of storage units in a first slice pool; in response to a determination that the first slice pool is expanded to a second slice pool, determining, at least based on a sum of the disk slices having been used to build the first set of storage units, a second distribution of updated disk slices used to build the first set of storage units in the second slice pool; determining, based on the first distribution and the second distribution, a first available number of disk slices and a second available number of disk slices available for building a second set of storage units in the second slice pool, the second set of storage units being different from the first set of storage units; and determining, at least based on the first available number and the second available number, the number of the second set of storage units allowed to be built.

In a third aspect of the present disclosure, there is provided a computer program product, which is tangibly stored on a non-transient computer readable medium and includes machine executable instructions, the machine executable instructions, when executed, causing a machine to execute the steps of the method of the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

In respective drawings, same or similar reference signs indicate same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of the present disclosure will be described below with reference to the accompanying drawings. It would be appreciated that these drawings and description are only provided as example embodiments. It should be pointed out that alternative embodiments of the structure and method disclosed herein are conceivable according to the following description, and these alternative embodiments may be used without departing from principles as claimed herein.

It is to be understood these example embodiments are discussed only for the purpose of enabling those skilled persons in the art to better understand and thus implement the present disclosure, rather than suggesting any limitations on the scope of the present disclosure.

As used herein, the term "includes", "comprises" and its variants are to be read as open-ended terms that mean "includes/comprises, but is not limited to." The term "based on" is to be read as "based at least in part on." The term "some example embodiments" is to be read as "at least some example embodiments"; and the term "another embodiment" is to be read as "at least one another embodiment". Relevant definitions of other terms may be comprised below.

Figure 1:
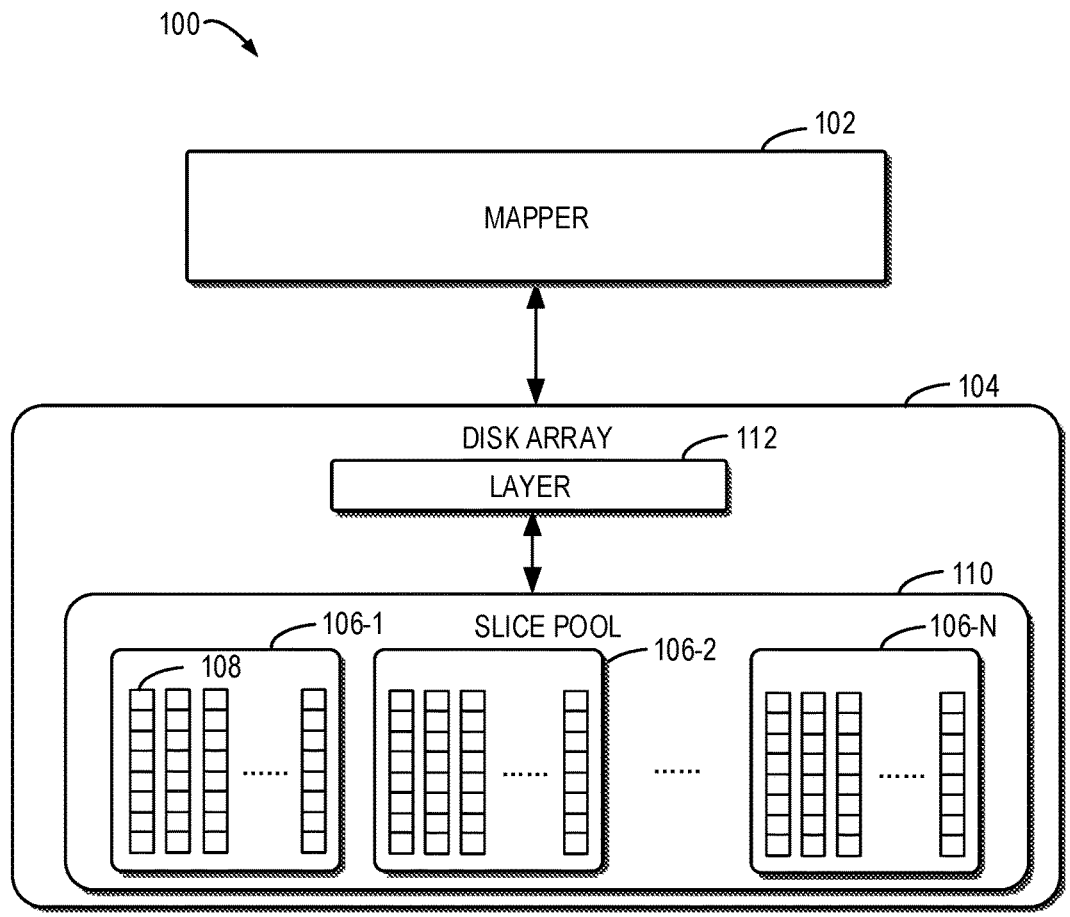
FIG. 1 illustrates a schematic diagram of an example system 100 in which embodiments of the present disclosure can be implemented.

FIG. 1 illustrates a schematic diagram of an example system 100 in which embodiments of the present disclosure can be implemented. The system 100 includes a mapper 102. The mapper 102 may be used to map the address in the user request to the physical space for storing data, so that the user can read or write the data.

The mapper 102 can provide a logical storage space of a predetermined size to an upper-layer application. In some examples, the size of the logical storage space can be 8 EB. The above examples are only used to illustrate the amount of logical storage space that can be provided, and are not a limitation on the present disclosure. You can set any size of logical storage space as needed.

In the mapper 102, any suitable structure may be adopted to maintain the mapping between logical addresses and physical addresses. In an example, a B+tree is adopted to maintain the mapping between logical addresses and physical addresses. The mapping includes a mapping of virtual logical blocks to physical blocks. A virtual logic block includes one or more nodes. The above examples are merely for illustration but not intended to limit the present disclosure. The mapping between the logical address and the physical address in the mapper 102 can be set to any suitable structure based on the requirement.

In one example, the address of the physical block is stored in the node. In one example, the minimum granularity of the mapping is 4 KB pages. The above examples are merely for illustration but not intended to limit the present disclosure. Based on the requirement, any suitable information associated with the physical block can be stored and the mapping granularity can be set to any size.

In an example, if the mapper 102 receives a write request, the mapper 102 may first aggregate enough 4 KB pages into a 2 MB Physical Large Block (PLB), and then performs a write request in units of PLB. In the case that the mapper 102 receives the read request, the mapper 102 may execute the read request in units of physical addresses 2 MB or less.

The storage system 100 further includes a disk array 104. In one example, the disk array may be a RAID. In another example, the disk array may be any suitable type of disk array. The disk array has a predetermined width. The width of the disk array refers to the number of disks building the stripes in the disk array. In one example, a RAID 5 with a disk array width of 4+1 may indicate that the number of disks that build the RAID 5 stripe is 4+1, wherein 4 disks may be used to store data, and 1 disk may be used to store parity data.

The disk array 104 includes a slice pool 110. The slice pool 110 includes one or more disks 108. Each disk 108 is divided into one or more fixed-size disk slices. As shown in FIG. 1, a disk 108 may for example include eight disk slices. The above examples are only for the purpose of illustrating the disclosure but not intended to limit the disclosure. In other embodiments, each disk can be set to include any number of disk slices as needed.

The size of the disk slice can be set to any value as required. In an example, the size of the disk slice is 4 GB. The above examples are only used to illustrate the disclosure, but not to limit the disclosure. In other embodiments, disk slices of can be set to any size as needed.

Each disk in the slice pool 110 is grouped into one or more RRS 106-1, 106-2, . . . , 106-N (which may be collectively referred to as RAID RRS 106), N is a positive integer greater than 1. Considering the reliability of RAID, the number of disks comprised in an RRS needs to be limited. Therefore, the number N of the RAID RRSs 106 depends on the number of disks. Generally, the number of disks comprised in each RRS is limited to 25. If the number of disks exceeds 25, a new RRS needs to be created.

The slices in the RAID RRS 106 can be used to form one or more logical storage units. In one example, the slices in a logical storage unit are all from a RAID RRS. A logical storage unit may be equivalent to a traditional RAID. In one example, a mapping between a logical storage unit and a physical block is stored in the mapper 102. The above examples are only used to illustrate the disclosure, but not to limit the disclosure.

The disk array 104 also includes one or more layers. As shown in FIG. 1, the disk array may include layer 112, for example. The above examples are only used to illustrate the disclosure, but not to limit the disclosure. Any suitable number of layers can be set as needed.

The layer 112 may be read and/or invoked by mapper 102. The layer 112 includes one or more logical storage units. The logical storage unit (or data element or extent) can be considered as a group of RAID stripes associated with a plurality of disk slices. Alternatively, or additionally, the logical storage units have the same disk array format in the layer 112. In one example, different layers may have different disk array formats. In another example, different layers may have the same disk array format.

In some examples, the logical storage units in layer 112 may have a suitable disk array type and/or disk array width. For example, the logical storage unit uses RAID 5 with a disk array width of 4+1, RAID 5 with a disk array width of 8+1, or RAID 5 with a disk array width of 16+1. The above examples are only for illustration but not intended to limit the present disclosure. The logical storage units can adopt any suitable disk array type and disk array width in the layer as needed.

In order to determine the number of storage units that can be built, it is necessary to determine the disk effective capacity of in a RRS, which can be understood as the disk slice capacity that can be used to build a storage unit in a disk. When the RAID width requirements cannot be reached due to insufficient disks of the same type, the disk effective capacity may be smaller than the disk physical capacity. In addition, in RRS, in order to ensure that there is sufficient spare space for data storage, a certain number of disk slices are reserved as a spare disk. When a disk in the RRS is damaged and the data in the RRS needs to be rebuilt to a spare space, the storage unit in the RRS can continue to provide services for IO and still have a RAID algorithm to protect user data. Generally, the size of the spare space is equal to the maximum disk effective capacity in the RRS.

Figure 2:
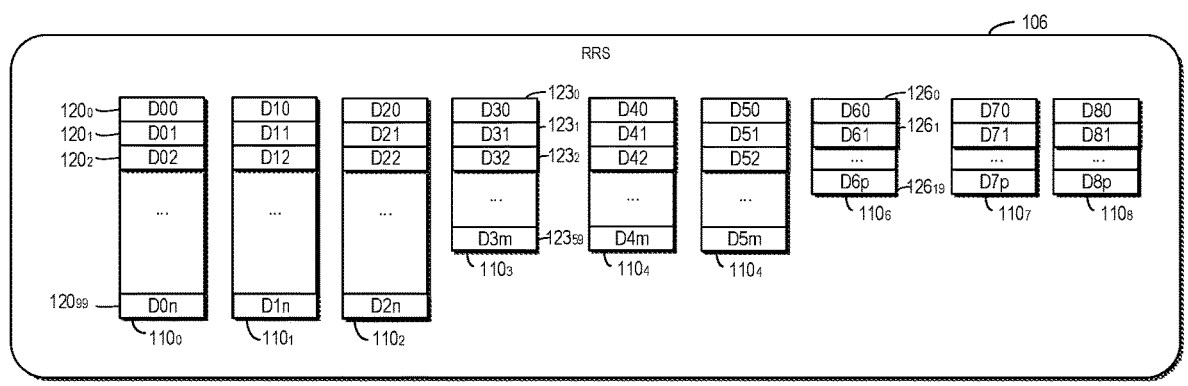
FIG. 2 illustrates a schematic diagram of a RRS architecture in accordance with embodiments of the present disclosure.

FIG. 2 illustrates a schematic diagram of a RRS architecture in accordance with embodiments of the present disclosure. As shown in FIG. 2, in a RAID 5 (4+1) system, there are a total of 9 disks $110_0$-$110_8$ in RRS 106. The disks $110_0$-$110_2$ are of the same type and have a maximum physical capacity of 100 disk slices (for example, the disk $110_0$ has disk slices $120_0$-$120_{99}$), the disks $110_3$-$110_5$ has the same type and has a maximum physical capacity of 60 disk slices (for example, the disk $110_3$ has disk slices $123_0$-$123_{59}$), and the disks $110_6$-$110_8$ has the same type and has a maximum physical capacity of 20 disk slices (for example, the disk $110_6$ has disk slices $126_0$-$126_{19}$). In a RAID 5 (4+1) system, at least 6 disks should be used to allocate disk slices to storage units. Taking the RRS 106 in FIG. 2 as an example, the disk effective capacity $110_0$-$110_8$ can be listed in the following table:

TABLE 1

| | effective capacity | | | | | | | | |
|---|---|---|---|---|---|---|---|---|---|
| disk number | $110_0$ | $110_1$ | $110_2$ | $110_3$ | $110_4$ | $110_5$ | $110_6$ | $110_7$ | $110_8$ |
| maximal disk capacity | 100 | 100 | 100 | 60 | 60 | 60 | 20 | 20 | 20 |
| disk effective capacity | 60 | 60 | 60 | 60 | 60 | 60 | 20 | 20 | 20 |

In a RAID 5 (4+1) system, the RAID stripe width, that is, the number of disk slices that build a RAID stripe, is 5. To allocate disk slices to storage units, there should be at least 6 disks in a RAID 5 (4+1) system, so the reserved space is 6 disk slices.

To allocate storage units, it should be determined that whether there are sufficient available slices in the slice pool. The number of available storage units will be calculated. If the number of available storage units exceeds the number of storage units intend to allocate, the allocation procedure can be further executed, otherwise the allocation request will not be completed.

If the slice pool is static, that is, no disks need to be added or deleted, and no rebalancing is required, the number of available storage units can be calculated based on free slices in the slice pool. If some disks need to be added or deleted and rebalancing is required, the effects of rebalancing should also be considered. Because the disk slices allocated to the storage unit may differ between before and after rebalancing.

Therefore, the number of available storage units, which is previously calculated based on the fact that no rebalancing is needed, may not be accurate after rebalancing. If the calculated number of available storage units is greater than the number of storage units that are actually available after rebalancing, an error occurs in the system.

Accordingly, embodiments of the present disclosure provide a method for determining the number of storage units allowed to be built. In this method, the number of storage units allowed to be built is determined based on the distribution of disk slices of storage units having been used to build before and after rebalancing and the actual effective capacity of each disk.

Figure 3:
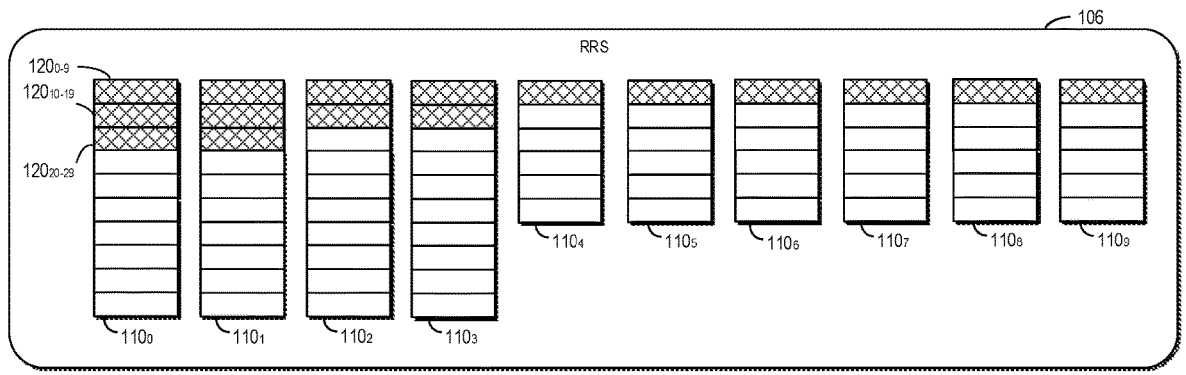
FIG. 3 illustrates a schematic diagram of a state of a disk slice in an RRS in accordance with embodiments of the present disclosure.

FIG. 3 illustrates a schematic diagram of a state of a disk slice in an RRS in accordance with embodiments of the present disclosure. With reference to FIG. 3, the number of effective available disk slices of each disk in the RRS 106 before rebalancing, that is, disks in the RRS 106 are not added or deleted yet.

The number of available storage units can be obtained by the sum of the number of available storage units in the RRS. As shown in FIG. 3, the RRS 106 includes disks $110_0$-$110_9$. The disks $110_0$-$110_3$ have the same type and have a physical capacity of up to 100 disk slices, and disks $110_4$-$110_9$ have the same type and have a physical capacity of up to 50 disk slices. Some of the disks $110_0$-$110_9$ have been used to build storage units, that is, non-free disk slices, such as disks $120_{0-29}$ in disk $110_0$. The calculation of the number of available storage units in RRS 106 can be achieved by the following steps:

First, the number of effective free disk slices of the disk and the number of processed effective free disk slices determined based on the disk extents of the storage unit can be determined. In FIG. 3, a RAID 5 (4+1) system is still taken as an example. For disk $110_0$, although the actual free disk slice is 70, the maximum effective capacity of disk $110_0$ minus the number of consumed disk slices is 20. Therefore, the effective free disk slice of the disk $110_0$ is 20, because 20 can be divided by 4 (the disk extent of the storage unit of the RAID 5 (4+1) system is 4), so the number of processed effective free disk slices is also 20. Referring to disk $110_2$ again, its effective free disk slice is 30, but 30 is not divisible by 4, so the number of processed effective free disk slices is 28. Thus, the number of effective free disk slices and processed effective free disk slices of each disk in the RRS 106 can be shown in the following table.

TABLE 2

| | number of effective available disk slice | | | | | | | | | |
|---|---|---|---|---|---|---|---|---|---|---|
| disk number | $110_0$ | $110_1$ | $110_2$ | $110_3$ | $110_4$ | $110_5$ | $110_6$ | $110_7$ | $110_8$ | $110_9$ |
| max. nominal capacity | 100 | 100 | 100 | 100 | 50 | 50 | 50 | 50 | 50 | 50 |
| max. effective capacity | 50 | 50 | 50 | 50 | 50 | 50 | 50 | 50 | 50 | 50 |
| consumed slices | 30 | 30 | 20 | 20 | 10 | 10 | 10 | 10 | 10 | 10 |
| actual free slices | 70 | 70 | 80 | 80 | 40 | 40 | 40 | 40 | 40 | 40 |
| effective free slices | 20 | 20 | 30 | 30 | 40 | 40 | 40 | 40 | 40 | 40 |
| processed effective free slices | 20 | 20 | 28 | 28 | 40 | 40 | 40 | 40 | 40 | 40 |

Therefore, it is possible to calculate the sum of the number of processed effective free disk slices in all disks in RRS 106. The sum of the number of available storage units in the RRS may be corresponding to the difference between the sum of the number of processed effective free disk slices in all disks and the number of disk slices for reserved space divided by the number of disk slices comprised in one storage unit. The number of disk slices comprised in one storage unit is equal to the RAID stripe width multiplied by the number of disk extents of the storage unit.

Figure 4A:
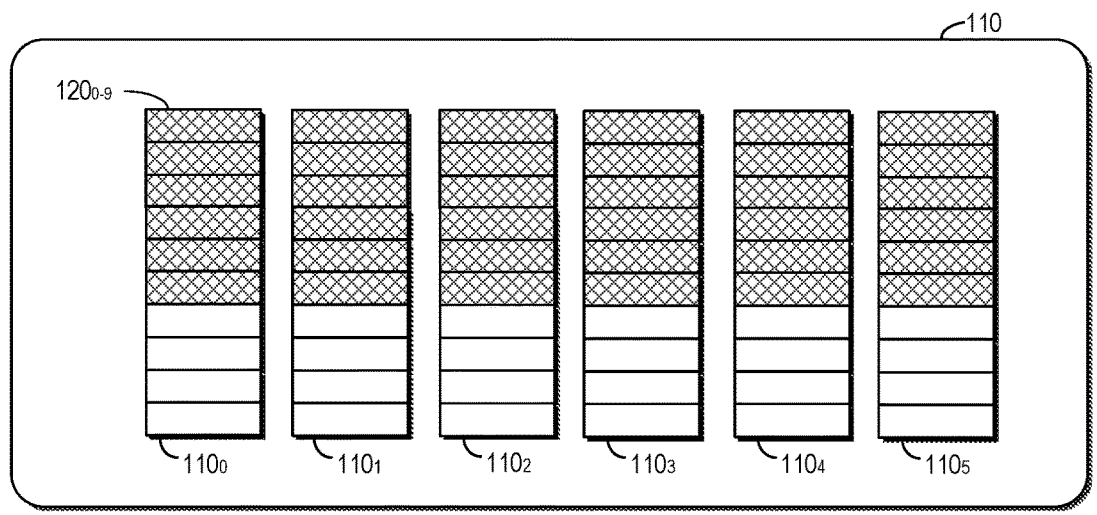
FIGS. 4A and 4B show a distribution change between disk slices used to build a storage unit in an RRS before expansion and in an RRS after expansion in accordance with an embodiment of the present disclosure.
Figure 4B:
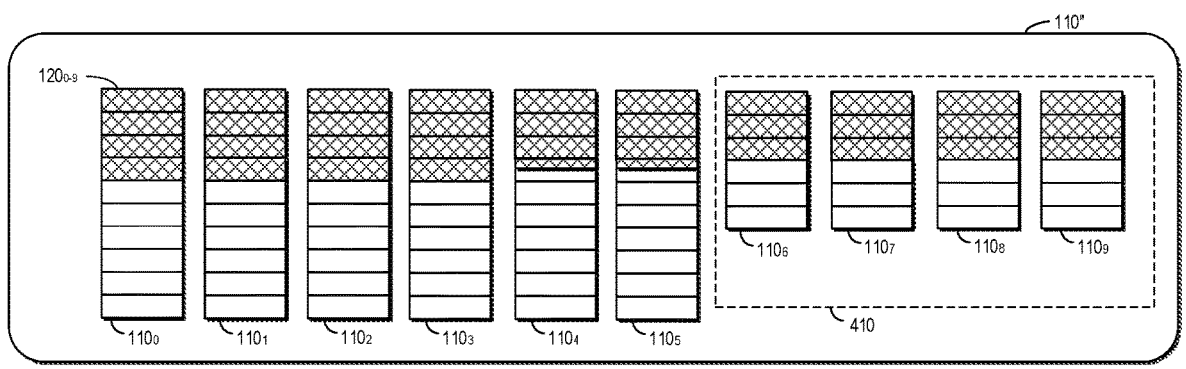

As described above, the number of storage units allowed to be built can be determined based on the distribution of disk slices of storage units having been used to build before and after the rebalancing and the actual effective capacity of each disk. FIGS. 4A and 4B show a distribution change between disk slices used to build a storage unit in an RRS before expansion and in an RRS after expansion in accordance with an embodiment of the present disclosure As shown in FIG. 4A, the slice pool 110 may include disks $110_0$-$110_5$, and each disk includes 100 disk slices. The disk slices (e.g., $120_{0-9}$) filled in the disks $110_0$-$110_5$ can be regarded as disk slices that have been used to build the first set of storage units. In the example shown in FIG. 4A, a total of 18 storage units are built, each storage unit occupying 20 disk slices. Therefore, each of the disks $110_0$-$110_5$ takes up 60 disk slices. The consumption status of the disk slices in the slice pool 110 is listed in the following table.

TABLE 3

| | Consumption status of disk slices in the slice pool 110 | | | | | |
|---|---|---|---|---|---|---|
| disk number | $110_0$ | $110_1$ | $110_2$ | $110_3$ | $110_4$ | $110_5$ |
| max. nominal capacity | 100 | 100 | 100 | 100 | 100 | 100 |
| max. effective capacity | 100 | 100 | 100 | 100 | 100 | 100 |
| consumed slices | 60 | 60 | 60 | 60 | 60 | 60 |
| free slices | 40 | 40 | 40 | 40 | 40 | 40 |

Thus, a first distribution of disk slices in the slice pool 110 that has been used to build the first set of storage units can be obtained. This distribution can be understood as the position in the slice pool 110 of the disk slices that have been used to build the first set of storage units.

In some embodiments, the position of the disk slice used to build the first set of storage units in the slice pool 110 may be determined based on the number of disk slices that have been used to build the first set of storage units, the number of disks $110_0$-$110_5$ comprised in the slice pool 110, and the stripe width of the storage unit.

As shown in FIG. 4B, the slice pool 110 is expanded into a slice pool 110″ by at least one additional disk 410 (disks $110_6$-$110_9$). The expanded slice pool 110″ includes disks $110_0$-$110_9$. Because the capacity of the slice pool is expanded, the position of the disk slices having been used to build the first set of storage units in the slice pool 110″ will be updated. This update can be understood as rebalancing the position of the disk slices having been used to build the first set of storage units in the slice pool 110″. The purpose is to make used disk slices between adjacent disk arrays look as "flat" as possible. Assuming that the utilization of each disk is similar and a result of the rebalancing is simulated, the slice pool 110″ can be considered empty at the initial stage, and then select the disk with the lowest utilization for the first set of storage units one by one. Whenever a disk slice of the first set of storage units is allocated, the disk slices of the selected disk will reduce by a disk extent of the storage unit, and its utilization rate will be updated accordingly.

Therefore, after adding disks $110_6$-$110_9$, the disk slices used to build the first set of storage units must be adjusted. As mentioned above, a total of 18 storage units are built, each storage unit occupies 20 disk slices. Therefore, once a storage unit is built, 5 disks are selected, and 4 disk slices are taken from each disk. The consumption state of the disks $110_0$-$110_9$ after reselecting the disk slices to build each of the first set of storage units is shown in the following table.

TABLE 4

| | Disk utilization in the reselecting procedure | | | | | | | | | |
|---|---|---|---|---|---|---|---|---|---|---|
| disk number | $110_0$ | $110_1$ | $110_2$ | $110_3$ | $110_4$ | $110_5$ | $110_6$ | $110_7$ | $110_8$ | $110_9$ |
| max. nominal capacity | 100 | 100 | 100 | 100 | 100 | 100 | 80 | 80 | 80 | 80 |
| max. effective capacity | 100 | 100 | 100 | 100 | 100 | 100 | 80 | 80 | 80 | 80 |
| at the beginning | 0% | 0% | 0% | 0% | 0% | 0% | 0% | 0% | 0% | 0% |
| after building the $1^{st}$ storage unit | 4% | 4% | 4% | 4% | 4% | | | | | |

TABLE 4-continued

Disk utilization in the reselecting procedure

| disk number | $110_0$ | $110_1$ | $110_2$ | $110_3$ | $110_4$ | $110_5$ | $110_6$ | $110_7$ | $110_8$ | $110_9$ |
|---|---|---|---|---|---|---|---|---|---|---|
| after building the 2$^{nd}$ storage unit | | | | | | 4% | 5% | 5% | 5% | 5% |
| after building the 3$^{rd}$ storage unit | 8% | 8% | 8% | 8% | 8% | | | | | |
| after building the 4$^{th}$ storage unit | | | | | | 8% | 10% | 10% | 10% | 10% |
| after building the 5$^{th}$ storage unit | 12% | 12% | 12% | 12% | 12% | | | | | |
| after building the 6$^{th}$ storage unit | | | | | | 12% | 15% | 15% | 15% | 15% |
| after building the 7$^{th}$ storage unit | 16% | 16% | 16% | 16% | 16% | | | | | |
| after building the 8$^{th}$ storage unit | | | | | | 16% | 20% | 20% | 20% | 20% |
| after building the 9$^{th}$ storage unit | 20% | 20% | 20% | 20% | 20% | | | | | |
| after building the 10$^{th}$ storage unit | 24% | 24% | 24% | 24% | | 20% | | | | |
| after building the 11$^{th}$ storage unit | | | | | 24% | 24% | 25% | 25% | 25% | |
| after building the 12$^{th}$ storage unit | 28% | 28% | 28% | 28% | | | | | 25% | |
| after building the 13$^{th}$ storage unit | | | | | 28% | 28% | 30% | 30% | 30% | |
| after building the 14$^{th}$ storage unit | 32% | 32% | 32% | 32% | | | | | 30% | |
| after building the 15$^{th}$ storage unit | | | | | 32% | 32% | 35% | 35% | 35% | |
| after building the 16$^{th}$ storage unit | 36% | 36% | 36% | 36% | | | | | 35% | |
| after building the 17$^{th}$ storage unit | | | | | 36% | 36% | 40% | 40% | 40% | |
| after building the 18$^{th}$ storage unit | 40% | 40% | 40% | 40% | | | | | 40% | |

FIG. 4B shows the updated distribution state of the disk slices in the disks $110_0$-$110_9$ in the slice pool 110" selected to build the first set of storage units after rebalancing. This distribution can be considered as the position of the disk slice that has been used to build the first set of storage units in the slice pool 110".

In some embodiments, the position of the disk slices used to build the first set of storage units in the slice pool 110" may be determined based on the number of disk slices that have been used to build the first set of storage units, the number of disks $110_0$-$110_9$ comprised in the slice pool 110" and the stripe width of the storage unit. The consumption status of the disk slices in the slice pool 110" in FIG. 4B is listed in the following table.

TABLE 5

Consumption status of disk slices in the slice pool 110"

| disk number | $110_0$ | $110_1$ | $110_2$ | $110_3$ | $110_4$ | $110_5$ | $110_6$ | $110_7$ | $110_8$ | $110_9$ |
|---|---|---|---|---|---|---|---|---|---|---|
| max. nominal capacity | 100 | 100 | 100 | 100 | 100 | 100 | 80 | 80 | 80 | 80 |
| max. effective capacity | 80 | 80 | 80 | 80 | 80 | 80 | 80 | 80 | 80 | 80 |
| consumed slices | 40 | 40 | 40 | 40 | 36 | 36 | 32 | 32 | 32 | 32 |
| disk utilization | 40% | 40% | 40% | 40% | 36% | 36% | 40% | 40% | 40% | 40% |

Therefore, the number of effective free disk slices for each of the disks $110_0$-$110_9$ can be obtained, which are 40, 40, 40, 40, 44, 44, 48, 48, 48, 48. Since these numbers are all divisible by 4, the number of processed effective free disk slices for each of the disks $110_0$-$110_9$ is also 40, 40, 40, 40, 44, 44, 48, 48, 48, 48. As mentioned above, the sum of the number of available storage units may be equivalent to the difference between the sum of the number of processed effective free disk slices in all disks and the number of disk slices for reserved space divided by one storage unit. Therefore, the number of the second set of storage units allowed to be built by the disk slices in the slice pool 110" after the rebalancing can be obtained.

FIGS. 5A and 5B and FIGS. 6A and 6B illustrate an example of determining the number of storage units allowed to be built in accordance with embodiments of the present disclosure, respectively. In the following, it will be described in detail again how to determine the number of storage units allowed to be built by the remaining free disk slices in the case that the slice pool is expanded in conjunction with FIGS. 5A to 6B.

Figure 5A:
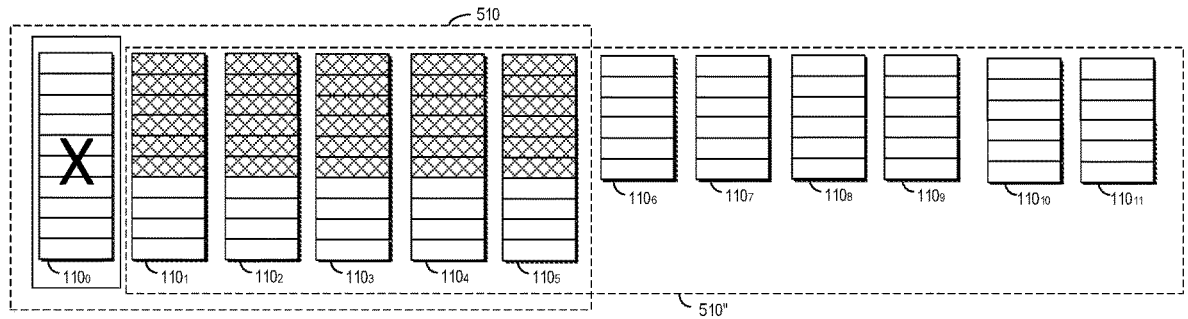
FIGS. 5A and 5B illustrate an example of determining the number of storage units allowed to be built in accordance with embodiments of the present disclosure.

In FIG. 5A, the slice pool 510 before expansion and the slice pool 510 after expansion are shown. The slice pool 510 may include disks $110_0$-$110_5$, and each of the disks $110_0$-$110_5$ includes 100 disk slices. The disk $110_0$ in the slice pool 510 may be fail before expansion fails, for example, and the disks $110_6$-$110_{11}$ are added to the slice pool 510 to form a new slice pool 510". Each of the added disks $110_6$-$110_{11}$ includes 50 disk slices. 15 RAID 5 (4+1) storage units have been built. As shown in FIG. 5A, before rebalancing, the utilization and availability of the disk slices in the disks $110_1$-$110_{11}$ can be shown in the following table:

TABLE 6

Consumption status of disk slices before rebalancing

| disk number | $110_0$ | $110_1$ | $110_2$ | $110_3$ | $110_4$ | $110_5$ | $110_6$ | $110_7$ | $110_8$ | $110_9$ | $110_{10}$ | $110_{11}$ |
|---|---|---|---|---|---|---|---|---|---|---|---|---|
| max. nominal capacity | 100 | 100 | 100 | 100 | 50 | 50 | 50 | 50 | 50 | 50 | 50 | 50 |
| max. effective capacity |  | 50 | 50 | 50 | 50 | 50 | 50 | 50 | 50 | 50 | 50 | 50 |
| consumed slices |  | 60 | 60 | 60 | 60 | 60 | 0 | 0 | 0 | 0 | 0 | 0 |
| actual free slices |  | 40 | 40 | 40 | 40 | 40 | 50 | 50 | 50 | 50 | 50 | 50 |
| effective free slices |  | 0 | 0 | 0 | 0 | 0 | 50 | 50 | 50 | 50 | 50 | 50 |
| processed effective free slices |  | 0 | 0 | 0 | 0 | 0 | 48 | 48 | 48 | 48 | 48 | 48 |

Figure 5B:
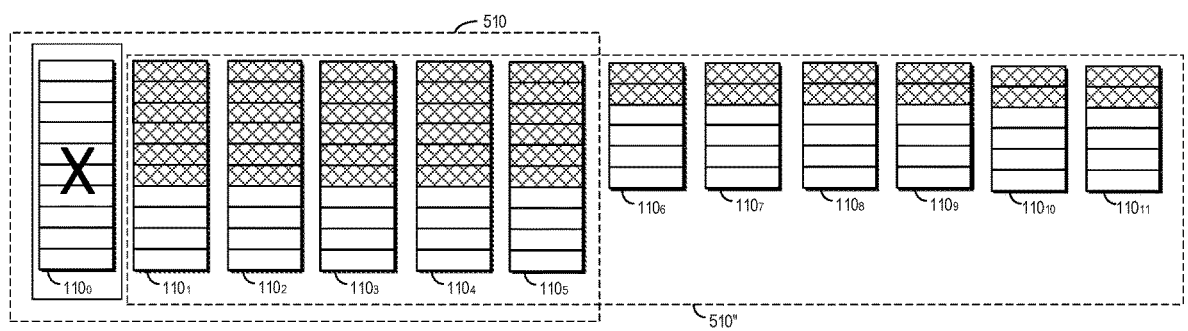

After rebalancing, some of the added disks $110_6$-$110_{11}$ can be used to build the storage unit. The distribution of the disk slices used to build the storage unit after rebalancing is shown in FIG. 5B.

TABLE 7

Consumption status of disk slices after rebalancing

| disk number | $110_0$ | $110_1$ | $110_2$ | $110_3$ | $110_4$ | $110_5$ | $110_6$ | $110_7$ | $110_8$ | $110_9$ | $110_{10}$ | $110_{11}$ |
|---|---|---|---|---|---|---|---|---|---|---|---|---|
| max. nominal capacity | 100 | 100 | 100 | 100 | 50 | 50 | 50 | 50 | 50 | 50 | 50 | 50 |
| max. effective capacity |  | 50 | 50 | 50 | 50 | 50 | 50 | 50 | 50 | 50 | 50 | 50 |
| consumed slices |  | 36 | 36 | 36 | 36 | 36 | 20 | 20 | 20 | 20 | 20 | 20 |
| actual free slices |  | 64 | 64 | 64 | 64 | 64 | 30 | 30 | 30 | 30 | 30 | 30 |
| effective free slices |  | 14 | 14 | 14 | 14 | 14 | 30 | 30 | 30 | 30 | 30 | 30 |
| processed effective free slices |  | 12 | 12 | 12 | 12 | 12 | 28 | 28 | 28 | 28 | 28 | 28 |
| disk number |  | 36% | 36% | 36% | 36% | 36% | 40% | 40% | 40% | 40% | 40% | 40% |

In this case, for the slice pool 510" before rebalancing, the sum of effective free disk slices is 48+48+48+48+48+48=288 disk slices. The maximum number of storage units allowed to be built (sum of effective free disk slices-disk slices for the spare disk)/the number of disk slices of one storage unit=(288−50)/20=11

For the slice pool 510" after rebalancing, the sum of effective free disk slices is 28+28+28+28+28+28+12+12+12+12+12=228 disk slices. The maximum number of storage units still allowed to be built is (sum of effective free disk slices-disk slices for the spare disk)/the number of disk slices of one storage unit=(228−50)/20=8

It can be seen that the maximum number of storage units allowed to be built by the slice pool 510" before rebalancing is greater than the maximum number of storage units allowed to be built by the slice pool 510" after rebalancing, so the maximum number of the storage units allowed to be built is actually eight.

Figure 6A:
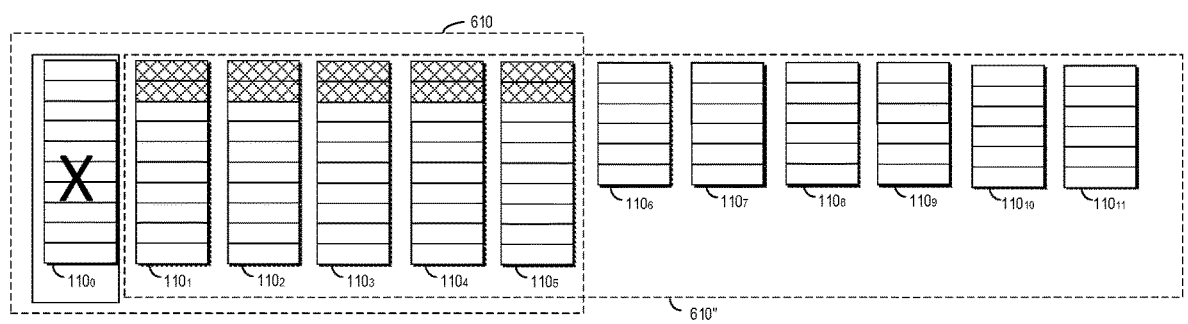
FIGS. 6A and 6B illustrate an example of determining the number of storage units allowed to be built in accordance with embodiments of the present disclosure.

FIG. 6A shows a slice pool 610 before expansion and a slice pool 610 after expansion. The slice pool 610 may include disks $110_0$-$110_5$, and each of the disks $110_0$-$110_5$ includes 100 disk slices. The disk $110_0$ in the slice pool 610 may be fail before expansion fails, for example, and the disks $110_6$-$110_{11}$ are added to the slice pool 610 to form a new slice pool 610". Each of the added disks $10_6$-$110_{11}$ includes 50 disk slices. 5 RAID 5 (4+1) storage units have been built. As shown in FIG. 6A, before rebalancing, the utilization and availability of the disk slices in the disks $110_1$-$110_{11}$ can be shown in the following table:

TABLE 8

Consumption status of disk slices before rebalancing

| disk number | $110_0$ | $110_1$ | $110_2$ | $110_3$ | $110_4$ | $110_5$ | $110_6$ | $110_7$ | $110_8$ | $110_9$ | $110_{10}$ | $110_{11}$ |
|---|---|---|---|---|---|---|---|---|---|---|---|---|
| max. nominal capacity | 100 | 100 | 100 | 100 | 100 | 50 | 50 | 50 | 50 | 50 | 50 | 50 |
| max. effective capacity | | 50 | 50 | 50 | 50 | 50 | 50 | 50 | 50 | 50 | 50 | 50 |
| consumed slices | | 20 | 20 | 20 | 20 | 20 | 0 | 0 | 0 | 0 | 0 | 0 |
| actual free slices | | 80 | 80 | 80 | 80 | 80 | 50 | 50 | 50 | 50 | 50 | 50 |
| effective free slices | | 30 | 30 | 30 | 30 | 30 | 50 | 50 | 50 | 50 | 50 | 50 |
| processed effective free slices | | 28 | 28 | 28 | 28 | 28 | 48 | 48 | 48 | 48 | 48 | 48 |

Figure 6B:
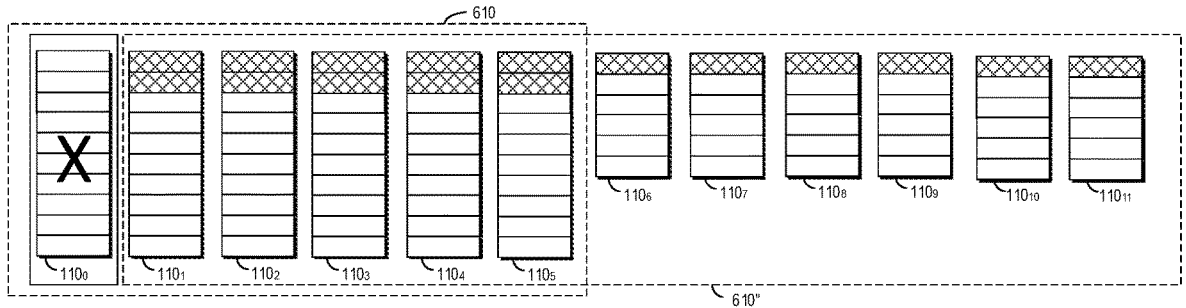

After rebalancing, some of the added disks $110_6$-$110_{11}$ can be used to build the storage unit. The distribution of the disk slices used to build the storage unit after rebalancing is shown in FIG. 6B.

TABLE 9

Consumption status of disk slices after rebalancing

| disk number | $110_0$ | $110_1$ | $110_2$ | $110_3$ | $110_4$ | $110_5$ | $110_6$ | $110_7$ | $110_8$ | $110_9$ | $110_{10}$ | $110_{11}$ |
|---|---|---|---|---|---|---|---|---|---|---|---|---|
| max. nominal capacity | 100 | 100 | 100 | 100 | 100 | 50 | 50 | 50 | 50 | 50 | 50 | 50 |
| max. effective capacity | | 50 | 50 | 50 | 50 | 50 | 50 | 50 | 50 | 50 | 50 | 50 |
| consumed slices | | 36 | 36 | 36 | 36 | 36 | 20 | 20 | 20 | 20 | 20 | 20 |
| actual free slices | | 64 | 64 | 64 | 64 | 64 | 30 | 30 | 30 | 30 | 30 | 30 |
| effective free slices | | 14 | 14 | 14 | 14 | 14 | 30 | 30 | 30 | 30 | 30 | 30 |
| processed effective free slices | | 12 | 12 | 12 | 12 | 12 | 28 | 28 | 28 | 28 | 28 | 28 |
| disk number | | 36% | 36% | 36% | 36% | 36% | 40% | 40% | 40% | 40% | 40% | 40% |

In this case, for slice pool 610" before rebalancing, the sum of effective free disk slices is 48+48+48+48+48+48+28+28+28+28+28=428 disk slices. The maximum number of storage units allowed to be built (sum of effective free disk slices-disk slices for the spare disk)/the number of disk slices of one storage unit=(428−50)/20=18

For the slice pool 610" after rebalancing, the sum of effective free disk slices is 40+40+40+40+40+40+36+36+36+36+36+36=420 disk slices. The maximum number of storage units still allowed to be built is (sum of effective free disk slices-disk slices for the spare disk)/the number of disk slices of one storage unit=(420−50)/20=18

It can be seen that the maximum number of storage units allowed to be built by the slice pool 610" before rebalancing is equal to the maximum number of storage units allowed to be built by the slice pool 610" after rebalancing, so the maximum number of the storage units allowed to be built is 18.

In this way, the available capacity allowed to be used to build a storage unit can be accurately estimated, which may prevent the number of storage units promised by the system from exceeding its maximum capacity, thereby avoiding emergencies in the system.

Figure 7:
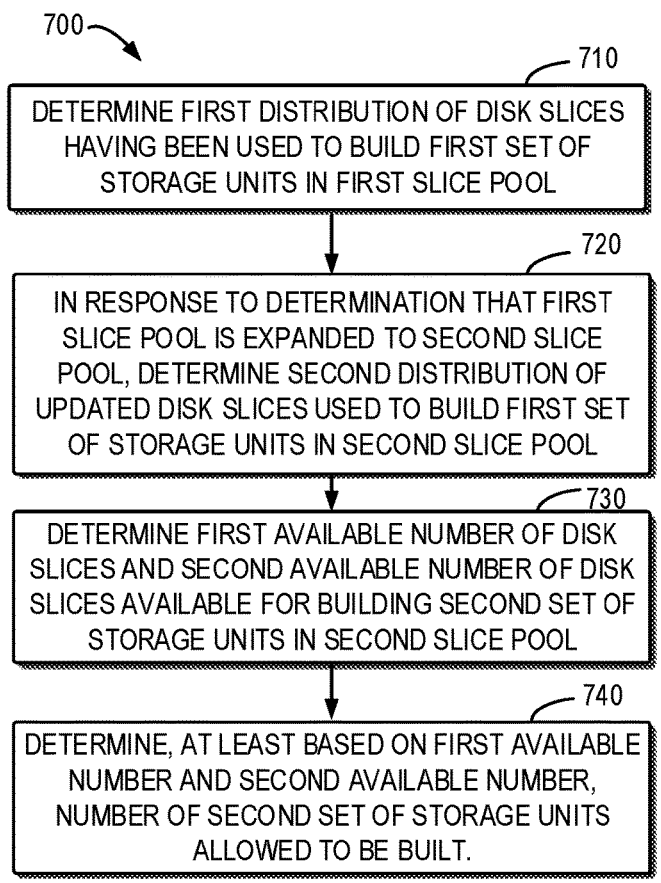
FIG. 7 illustrates a flowchart of the method 700 for storage management in accordance with embodiments of the present disclosure.

FIG. 7 illustrates a flowchart of a method 700 for managing a file system according to some embodiments of the present disclosure. The method 700 may be implemented at any of the mapper 102, the disk array 104, the slice pool 110 and the layer 112 shown in FIG. 1. The method 700 may be implemented, for example, by the mapper 102 provided in FIG. 1, or may be implemented by any other computing device in the operating environment 100.

At block 710, determining a first distribution of disk slices having been used to build a first set of storage units in a first slice pool.

In some embodiments, determining the first distribution includes determining the number of a plurality of disks comprised in the first slice pool and the number of disk slices comprised in stripes of the first set of storage units; determining, based on the sum, the number of the plurality of disks, and the number of disk slices comprised in the stripes, initial positions of the disk slices having been used to build the first set of storage units in first slice pool; and determining the first distribution based on the initial positions.

At block 720, in response to a determination that the first slice pool is expanded to a second slice pool, determining, at least based on a sum of the disk slices having been used to build the first set of storage units, a second distribution of updated disk slices used to build the first set of storage units in the second slice pool.

In some embodiments, determining the second distribution includes determining the number of a plurality of disks comprised in the second slice pool based on the number of at least one additional disk and the number of a plurality of disks comprised in the first slice pool; determining the number of disk slices comprised in stripes of the first set of storage units; determining updated positions of the updated disk slices in the second slice pool based on the sum of the disk slices having been used to build the first set of storage units, the number of a plurality of disks comprised in the second slice pool, and the number of disk slices comprised in the stripes; and determining the second distribution based on the updated positions.

At block 730, determining, based on the first distribution and the second distribution, a first available number of disk slices and a second available number of disk slices available for building a second set of storage units in the second slice pool, the second set of storage units being different from the first set of storage units.

In some embodiments, determining the first available number and the second available number includes determining a reference nominal capacity of a reference disk in disks comprised in the second slice pool; in response to a determination that the reference nominal capacity fails to exceed a threshold capacity, determining an effective nominal capacity for each of the disks as the reference nominal capacity; determining the first available number based on the first distribution and the effective nominal capacity; and determining the second available number based on the second distribution and the effective nominal capacity.

At block 740, determining, at least based on the first available number and the second available number, the number of the second set of storage units allowed to be built.

In some embodiments, determining the number of the second set of storage units allowed to be built includes determining a first predicted number of the second set of storage units allowed to be built based on the first available number, a reserved number of reserved disk slices required by the second set of storage units, and a required number of disk slices for building one of the second set of storage units; determining a second predicted number of the second set of storage units allowed to be built based on the second available number, the reserved number, and the required number; and determining the number of the second set of storage units allowed to be built by comparing the first prediction number and the second prediction number.

In some embodiments, in response to a determination that the second prediction number is less than the first prediction number, determining the second prediction number as the number of the second set of storage units allowed to be built.

Figure 8:
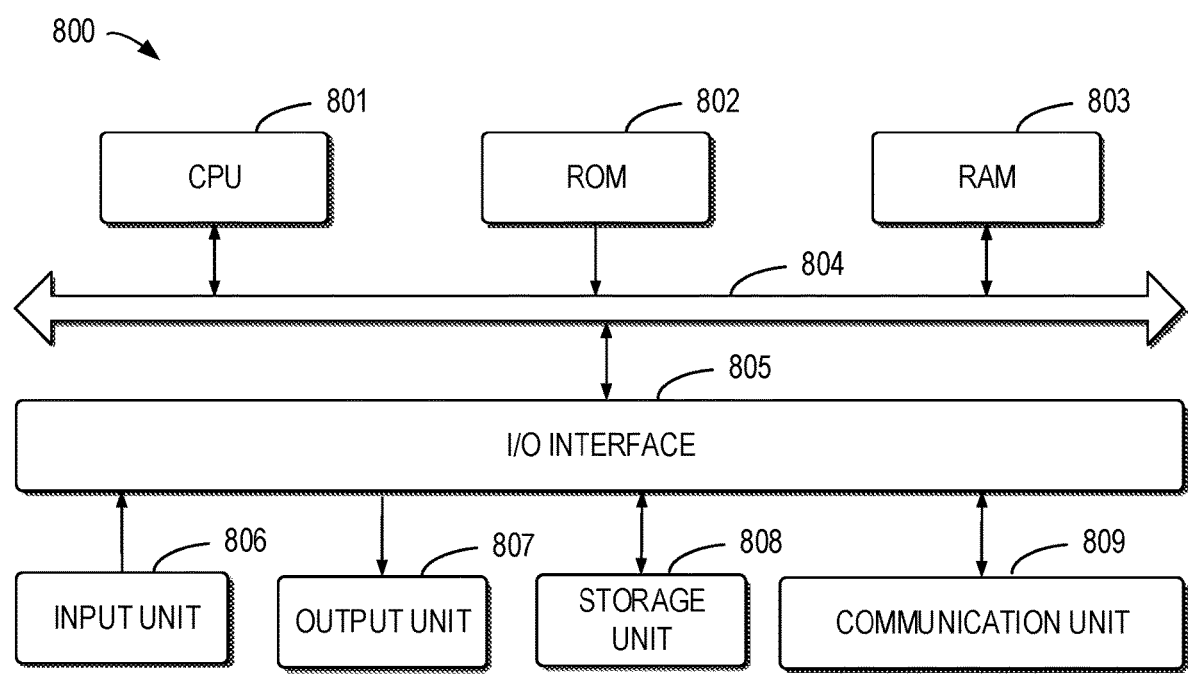
FIG. 8 illustrates a schematic block diagram of an example device 800 for implementing embodiments of the present disclosure.

FIG. 8 is a schematic block diagram illustrating an example device 800 that can be used to implement embodiments of the present disclosure. For example, any of the mapper 102, the disk array 104, the slice pool 110 and the layer 112 as shown in FIG. 1 can be implemented by the device 800. As shown, the device 800 includes a central processing unit (CPU) 801 that may perform various appropriate acts and processing based on computer program instructions stored in a read-only memory (ROM) 802 or computer program instructions loaded from a storage unit 804 to a random access memory (RAM) 803. In the RAM 803, there further store various programs and data needed for operations of the device 800. The CPU 801, ROM 802 and RAM 803 are connected to each other via a bus 804. An input/output (I/O) interface 805 is also connected to the bus 804.

The following components in the device 800 are connected to the I/O interface 805: an input unit 806, such as a keyboard, a mouse and the like; an output unit 807, such as various kinds of displays and a loudspeaker, etc.; a storage unit 808, such as a magnetic disk, an optical disk, and etc.; a communication unit 809, such as a network card, a modem, and a wireless communication transceiver, etc. The communication unit 809 allows the device 800 to exchange information/data with other devices through a computer network such as the Internet and/or various kinds of telecommunications networks.

Various processes and processing described above, e.g., the method 700, can be executed by the processing unit 801. For example, in some embodiments, the methods 300 and 400 can be implemented as a computer software program that is tangibly embodied on a machine readable medium, e.g., the storage unit 804. In some embodiments, part or all of the computer programs can be loaded and/or mounted onto the device 800 via ROM 802 and/or communication unit 809. When the computer program is loaded to the RAM unit 803 and executed by the CPU 801, one or more steps of the method 700 as described above may be executed.

The present disclosure is directed to a method, a device, a system and/or a computer program product. The computer program product may include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (system), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams can represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments of the present disclosure. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for storage management comprising:
determining a first distribution of disk slices having been used to build a first set of storage units in a first slice pool, wherein the first slice pool comprises a first plurality of disks, and wherein the first distribution of the disk slices having been used to build the first set of storage units in the first slice pool comprises a distribution, across the disks in the first plurality of disks, of the disk slices in the first slice pool having been used to build the first set of storage units, including:
counting a number of the plurality of disks in the first slice pool and a number of disk slices in stripes of the first set of storage units;
determining, based on a sum of the disk slices in the first plurality of disks having been used to build the first set of storage units, the number of the first plurality of disks, and the number of the disk slices in the stripes of the first set of storage units, initial positions of the disk slices having been used to build the first set of storage units in the first slice pool; and
wherein the first distribution comprises the initial positions;
in response to a determination that the first slice pool is expanded to a second slice pool, wherein the second slice pool comprises a second plurality of disks including the first plurality of disks and at least one additional disk, determining, at least based on the sum of the disk slices in each disk of the first plurality of disks having been used to build the first set of storage units, a second distribution of updated disk slices used to build the first set of storage units in the second slice pool, wherein the second distribution of updated disk slices used to build the first set of storage units in the second slice pool comprises a distribution, across the disks in the second plurality of disks, of the disk slices in the second slice pool used to build the first set of storage units, including:
counting a number of the second plurality of disks in the second slice pool based on a number of the at least one additional disk and the number of the first plurality of disks in the first slice pool;
determining updated positions of the updated disk slices in the second slice pool based on the sum of the disk slices in the first plurality of disks having been used to build the first set of storage units, the number of the second plurality of disks in the second slice pool, and the number of disk slices in the stripes of the first set of storage units; and
wherein the second distribution comprises the updated positions; and determining, based on the first distribution and the second distribution, a first available number of disk slices and a second available number of disk slices available for building a second set of storage units in the second slice pool, the second set of storage units being different from the first set of storage units.

2. The method of claim 1, further comprising:
wherein the first available number of disk slices and the second available number of disk slices available for building the second set of storage units in the second slice pool further comprises:
  determining a reference nominal capacity of a reference disk in disks in the second slice pool;
  in response to a determination that the reference nominal capacity fails to exceed a threshold capacity, determining an effective nominal capacity for each of the disks as the reference nominal capacity;
  determining the first available number based on the first distribution and the effective nominal capacity; and
  determining the second available number based on the second distribution and the effective nominal capacity; and
determining, at least based on the first available number and the second available number, the number of the second set of storage units allowed to be built, including:
  determining a first predicted number of the second set of storage units allowed to be built based on the first available number, a reserved number of reserved disk slices required by the second set of storage units, and a required number of disk slices for building one of the second set of storage units;
  determining a second predicted number of the second set of storage units allowed to be built based on the second available number, the reserved number, and the required number; and
determining the number of the second set of storage units allowed to be built by comparing the first prediction number and the second prediction number.

3. The method of claim 2, further comprising:
in response to a determination that the second prediction number is less than the first prediction number, determining the second prediction number as the number of the second set of storage units allowed to be built.

4. The method of claim 1, wherein each individual one of the first set of storage units, and each individual one of the second set of storage units, comprises an independent RAID (Redundant Array of Independent Disks) logical storage unit having multiple RAID stripes, a RAID width, and a corresponding set of disk slices from which it is built.

5. An electronic device comprising:
at least one processor; and
a memory coupled to the at least one processor, the memory having instructions stored therein, the instructions, when executed by the at least one processing unit, causing the device to execute acts, the acts comprising:
  determining a first distribution of disk slices having been used to build a first set of storage units in a first slice pool, wherein the first slice pool comprises a first plurality of disks, and wherein the first distribution of the disk slices having been used to build the first set of storage units in the first slice pool comprises a distribution, across the disks in the first plurality of disks, of the disk slices in the first slice pool having been used to build the first set of storage units, including:
    counting a number of the plurality of disks in the first slice pool and a number of disk slices in stripes of the first set of storage units;
    determining, based on a sum of the disk slices in the first plurality of disks having been used to build the first set of storage units, the number of the first plurality of disks, and the number of the disk slices in the stripes of the first set of storage units, initial positions of the disk slices having been used to build the first set of storage units in the first slice pool; and
    wherein the first distribution comprises the initial positions;
  in response to a determination that the first slice pool is expanded to a second slice pool, wherein the second slice pool comprises a second plurality of disks including the first plurality of disks and at least one additional disk, determining, at least based on the sum of the disk slices in each disk of the first plurality of disks having been used to build the first set of storage units, a second distribution of updated disk slices used to build the first set of storage units in the second slice pool, wherein the second distribution of updated disk slices used to build the first set of storage units in the second slice pool comprises a distribution, across the disks in the second plurality of disks, of the disk slices in the second slice pool used to build the first set of storage units, including:
    counting a number of the second plurality of disks in the second slice pool based on a number of the at least one additional disk and the number of the first plurality of disks in the first slice pool;
    determining updated positions of the updated disk slices in the second slice pool based on the sum of the disk slices in the first plurality of disks having been used to build the first set of storage units, the number of the second plurality of disks in the second slice pool, and the number of disk slices in the stripes of the first set of storage units; and
    wherein the second distribution comprises the updated positions; and
  determining, based on the first distribution and the second distribution, a first available number of disk slices and a second available number of disk slices available for building a second set of storage units in the second slice pool, the second set of storage units being different from the first set of storage units.

6. The device of claim 5, the acts further comprising:
wherein the first available number of disk slices and the second available number of disk slices available for building the second set of storage units in the second slice pool further comprises:
  determining a reference nominal capacity of a reference disk in disks in the second slice pool;
  in response to a determination that the reference nominal capacity fails to exceed a threshold capacity, determining an effective nominal capacity for each of the disks as the reference nominal capacity;
  determining the first available number based on the first distribution and the effective nominal capacity; and
  determining the second available number based on the second distribution and the effective nominal capacity; and
determining, at least based on the first available number and the second available number, the number of the second set of storage units allowed to be built, including:

determining a first predicted number of the second set of storage units allowed to be built based on the first available number, a reserved number of reserved disk slices required by the second set of storage units, and a required number of disk slices for building one of the second set of storage units;

determining a second predicted number of the second set of storage units allowed to be built based on the second available number, the reserved number, and the required number; and determining the number of the second set of storage units allowed to be built by comparing the first prediction number and the second prediction number.

7. The device of claim 6, the acts further comprising:

in response to a determination that the second prediction number is less than the first prediction number, determining the second prediction number as the number of the second set of storage units allowed to be built.

8. A computer program product having a non-transitory computer readable medium which stores a set of instructions to perform storage management; the set of instructions, when carried out by computerized circuitry, causing the computerized circuitry to perform a method of:

determining a first distribution of disk slices having been used to build a first set of storage units in a first slice pool wherein the first slice pool comprises a first plurality of disks, and wherein the first distribution of the disk slices having been used to build the first set of storage units in the first slice pool comprises a distribution, across the disks in the first plurality of disks, of the disk slices in the first slice pool having been used to build the first set of storage units, including:

counting a number of the plurality of disks in the first slice pool and a number of disk slices in stripes of the first set of storage units;

determining, based on a sum of the disk slices in the first plurality of disks having been used to build the first set of storage units, the number of the first plurality of disks, and the number of the disk slices in the stripes of the first set of storage units, initial positions of the disk slices having been used to build the first set of storage units in the first slice pool; and wherein the first distribution comprises the initial positions;

in response to a determination that the first slice pool is expanded to a second slice pool, wherein the second slice pool comprises a second plurality of disks including the first plurality of disks and at least one additional disk, determining, at least based on the sum of the disk slices in each disk of the first plurality of disks having been used to build the first set of storage units, a second distribution of updated disk slices used to build the first set of storage units in the second slice pool, wherein the second distribution of updated disk slices used to build the first set of storage units in the second slice pool comprises a distribution, across the disks in the second plurality of disks, of the disk slices in the second slice pool used to build the first set of storage units, including:

counting a number of the second plurality of disks in the second slice pool based on a number of the at least one additional disk and the number of the first plurality of disks in the first slice pool;

determining updated positions of the updated disk slices in the second slice pool based on the sum of the disk slices in the first plurality of disks having been used to build the first set of storage units, the number of the second plurality of disks in the second slice pool, and the number of disk slices in the stripes of the first set of storage units; and wherein the second distribution comprises the updated positions; and determining, based on the first distribution and the second distribution, a first available number of disk slices and a second available number of disk slices available for building a second set of storage units in the second slice pool, the second set of storage units being different from the first set of storage units.

* * * * *